US009927686B2

(12) United States Patent
Narikawa

(10) Patent No.: US 9,927,686 B2
(45) Date of Patent: Mar. 27, 2018

(54) PROJECTION APPARATUS, PROJECTION METHOD, AND STORAGE MEDIUM HAVING PROGRAM STORED THEREON, WHICH PROVIDE HIGH-QUALITY IMAGE BY EFFECTIVELY USING SPOKE PERIOD

(71) Applicant: CASIO COMPUTER CO., LTD., Shibuya-ku, Tokyo (JP)

(72) Inventor: Tetsuro Narikawa, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 554 days.

(21) Appl. No.: 14/014,099

(22) Filed: Aug. 29, 2013

(65) Prior Publication Data
US 2014/0063468 A1 Mar. 6, 2014

(30) Foreign Application Priority Data

Aug. 31, 2012 (JP) ................................. 2012-192575

(51) Int. Cl.
*G03B 21/20* (2006.01)
*G03B 33/08* (2006.01)
*H04N 9/31* (2006.01)

(52) U.S. Cl.
CPC ....... *G03B 21/206* (2013.01); *G03B 21/2033* (2013.01); *G03B 33/08* (2013.01);
(Continued)

(58) Field of Classification Search
CPC .............. G03B 21/2053; G03B 21/206; G03B 21/2033; G03B 21/2013; G03B 21/008;
(Continued)

(56) References Cited

U.S. PATENT DOCUMENTS 8,021,001 B2 9/2011 Iwanaga
8,465,159 B2 6/2013 Iwanaga
(Continued)

FOREIGN PATENT DOCUMENTS

JP 2007-94108 A 4/2007
JP 2008546010 A 12/2008
(Continued)

OTHER PUBLICATIONS

Korean Office Action dated Jan. 12, 2015, issued in counterpart Korean Application No. 10-2013-0103187.
(Continued)

*Primary Examiner* — Christina Riddle
*Assistant Examiner* — Christopher Lamb, II
(74) *Attorney, Agent, or Firm* — Holtz, Holtz & Volek PC

(57) ABSTRACT

A projection apparatus includes a spoke setting unit configured to set each change timing of changing the plurality of colors, and set spoke periods generated at the each change timing, a light source drive unit configured to drive the light source unit, based on the change timings and the spoke periods set by the spoke setting unit, a detection unit configured to obtain information indicating each light amount of the light for each of the plurality of colors, which are emitted from the projection unit during the spoke periods, and a light source controller configured to control the light source unit so as to adjust a color balance of color mixtures in the spoke periods to a predetermined balance based on the information obtained in the detection.

13 Claims, 10 Drawing Sheets

(52) U.S. Cl.
CPC ......... *H04N 9/3111* (2013.01); *H04N 9/3155* (2013.01); *H04N 9/3164* (2013.01); *H04N 9/3182* (2013.01)

(58) Field of Classification Search
CPC ..... G03B 21/14; G03B 21/204; H01L 33/502; G02F 1/133603; H04N 9/3182; H04N 9/3111; H04N 9/3155; G02B 26/008
See application file for complete search history.

(56) References Cited

U.S. PATENT DOCUMENTS

| | | | | |
|---|---|---|---|---|
| 2006/0268236 | A1* | 11/2006 | Prince | G03B 21/00 353/31 |
| 2007/0030294 | A1* | 2/2007 | Sawyers | G09G 3/007 345/690 |
| 2007/0035703 | A1* | 2/2007 | Hoffman | H04N 9/3114 353/85 |
| 2008/0055493 | A1* | 3/2008 | Hanano | G02B 27/1033 349/9 |
| 2008/0136977 | A1* | 6/2008 | Harada | H04N 9/312 348/759 |
| 2010/0073639 | A1 | 3/2010 | Shibasaki | |
| 2010/0315604 | A1 | 12/2010 | Peeters et al. | |
| 2010/0328554 | A1* | 12/2010 | Shibasaki | H04N 9/3161 348/760 |
| 2011/0292098 | A1 | 12/2011 | Iwanaga | |

FOREIGN PATENT DOCUMENTS

| | | |
|---|---|---|
| JP | 2010078751 A | 4/2010 |
| JP | 2010117496 A | 5/2010 |
| JP | 2011505658 A | 2/2011 |
| JP | 2012155268 A | 8/2012 |
| JP | 6064450 B2 | 1/2017 |
| KR | 1020080020608 A | 3/2008 |

OTHER PUBLICATIONS

Japanese Office Action (and English translation thereof) dated May 24, 2016, issued in counterpart Japanese Application No. 2012-192575.

Japanese Office Action dated Jan. 16, 2018 issued in Japanese Application No. 2016-247798.

* cited by examiner

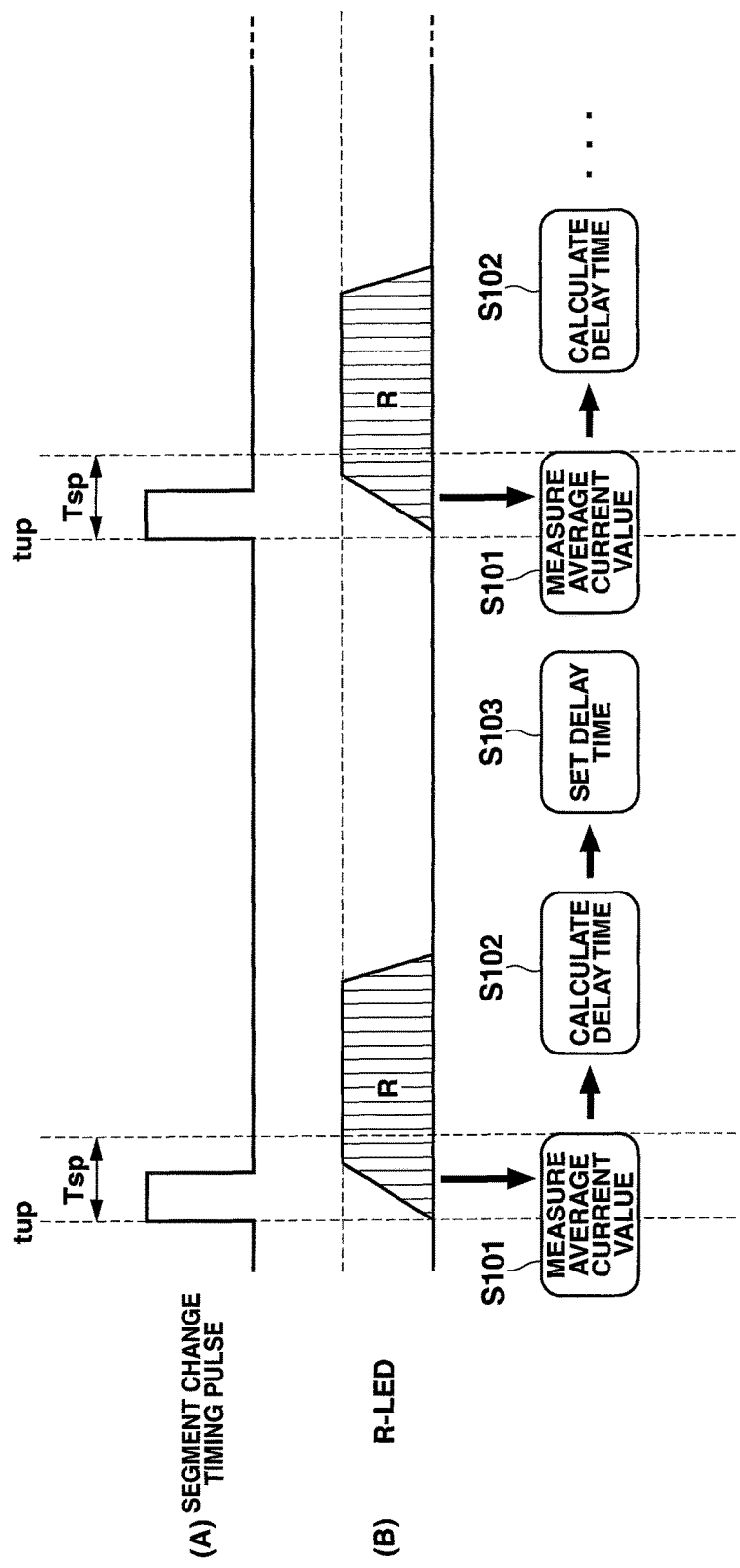

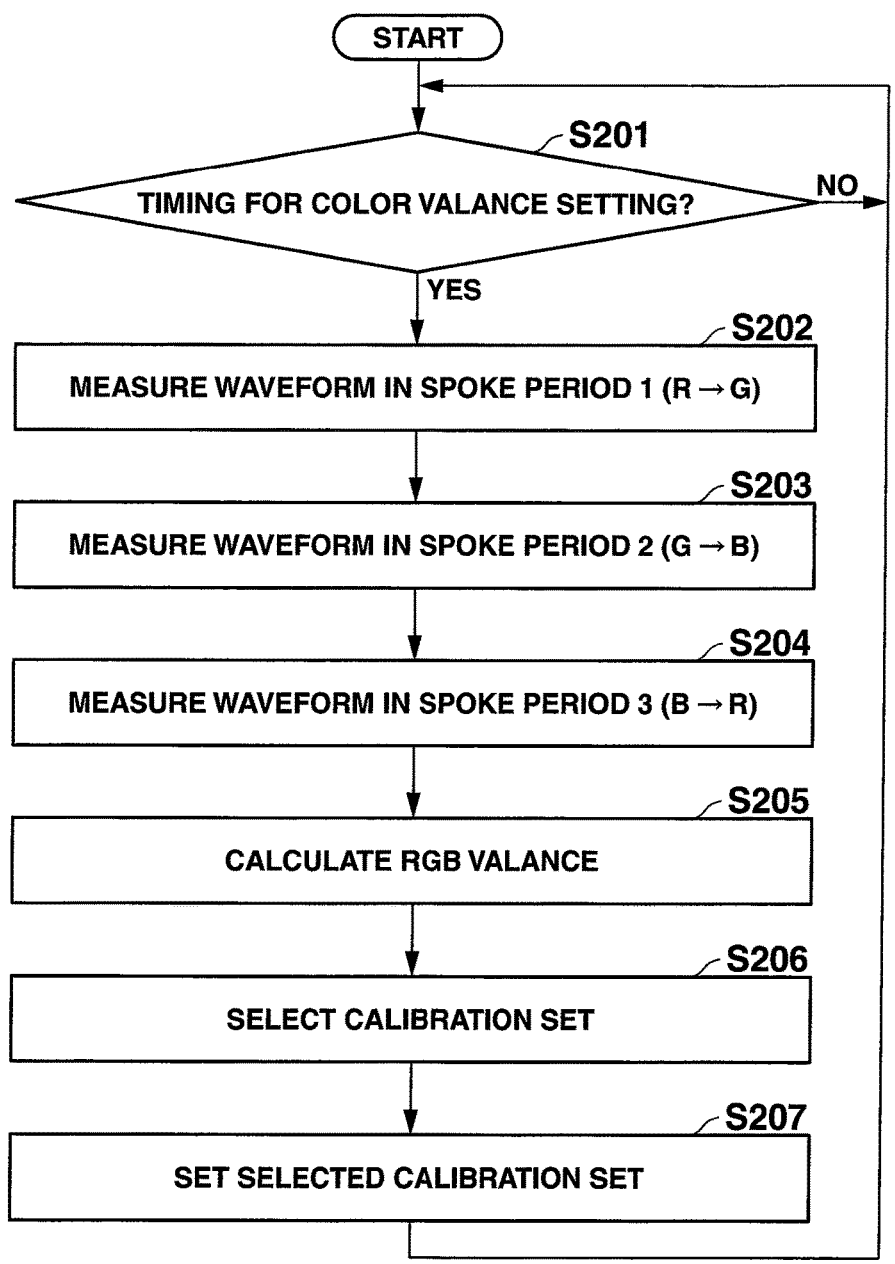

US 9,927,686 B2

PROJECTION APPARATUS, PROJECTION METHOD, AND STORAGE MEDIUM HAVING PROGRAM STORED THEREON, WHICH PROVIDE HIGH-QUALITY IMAGE BY EFFECTIVELY USING SPOKE PERIOD

CROSS-REFERENCE TO RELATED APPLICATIONS

This application is based upon and claims the benefit of priority from prior Japanese Patent Applications No. 2012-192575, filed Aug. 31, 2012; and No. 2012-192577, filed Aug. 31, 2012, the entire contents of all of which are incorporated herein by reference.

BACKGROUND OF THE INVENTION

1. Field of the Invention

The present invention relates to a projection apparatus, a projection method, and a storage medium having a program stored thereon, capable of adjusting differences of color balances, which occur during a spoke period.

2. Description of the Related Art

In a Digital-Light-Processing (DLP [registered trademark]) projector apparatus which uses semiconductor light emitting devices, such as light emitting diodes (LEDs) and semiconductor lasers (LDs) for a light source, light emission efficiency greatly varies between a timing immediately after starting light emission from a device and a much later timing.

Therefore, consideration of variation of the light emission efficiency is significant in improving quality of projection images.

In this respect, for example, Jpn. Pat. Appln. KOKAI Publication No. 2007-094108 discloses a technology in which influence from thermal change of a light source is suppressed by adjusting brightness of light emitting devices of individual colors of an LED array, based on supplied power waveform information which cancels variation in luminance of the LED array within each field period for each color component, to thereby maintain projection images at high quality.

For a projector apparatus, there is a difficulty in changing colors momentarily at a specific timing. Commonly, a period is provided in which a plurality of light emission colors are temporarily mixed. The changing period in which a plurality of colors are mixed is called a "spoke period" in association with a single-plate-type DLP method which has been developed based on use of a color wheel as a prerequisite. According to the DLP method, mixed-color light which is generated during the spoke period is measured in advance and is used effectively.

A semiconductor light emitting device achieves a current value as a target value, for example, by using a current control technology, such as PID control. However, the semiconductor light emitting devices have rise and fall properties concerning light emission driving which vary depending on voltages to apply, temperatures, and individual specificity of the devices. In addition, the rise and fall properties of light emission driving as described above vary depending on a capacitor volume inside a circuit including the semiconductor light emitting devices, and individual specificity and drive statuses of elements such as low-pass filters.

As the rise and fall properties of semiconductor light emitting devices vary, the color of the mixed-color light also varies. Such variation of properties of rise and fall of semiconductor light emitting devices as described can not properly be covered with the technology disclosed in a patent literature described above. If an actual light emission amount during a spoke period differs from a light emission amount measured in advance, continuity of gradations of projected colors is lost and consequently causes a problem of deterioration in image quality.

Hence, in consideration of variation of light emission statuses of semiconductor light emitting devices used as light sources, there is a demand for providing a projection apparatus, a projection method, and a storage medium having a program stored thereon, which are capable of projection with constantly precise and high image quality, maintaining continuity of gradations of colors.

BRIEF SUMMARY OF THE INVENTION

According to one aspect of the present invention, there is provided a projection apparatus comprising: a light source unit configured to time-divisionally emit light in a plurality of colors by light emission from a plurality of light emitting devices; a display element configured to form optical images respectively corresponding to the plurality of colors of the light emitted from the light source unit; a projection unit configured to emit the optical images formed by the display element toward a projection target; a spoke setting unit configured to set each change timing of changing the plurality of colors, and set spoke periods generated at the each change timing; a light source drive unit configured to drive the light source unit, based on the change timings and the spoke periods set by the spoke setting unit; a detection unit configured to obtain information indicating each light amount of the light for each of the plurality of colors, which are emitted from the projection unit during the spoke periods; and a light source controller configured to control the light source unit so as to adjust a color balance of color mixtures in the spoke periods to a predetermined balance based on the information obtained by the detection unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a chart for explaining a drive condition and content of control of a digital power supply to a LED which emits red (R) light, according to the embodiment;

FIG. 9 is a flowchart showing content of processings concerning gradation settings for spoke periods, according to the third embodiment of the invention.

DETAILED DESCRIPTION OF THE INVENTION

Hereinafter, preferred embodiments for practicing the invention will be described with reference to the drawings. However, the embodiments described below are subject to various limitations which are technologically suitable for practicing the invention although the scope of the invention is not limited to the embodiments below or illustrated examples.

First Embodiment

The first embodiment will now be described with reference to the drawings where the invention is applied to a DLP (registered trademark) projector apparatus.

Figure 1:
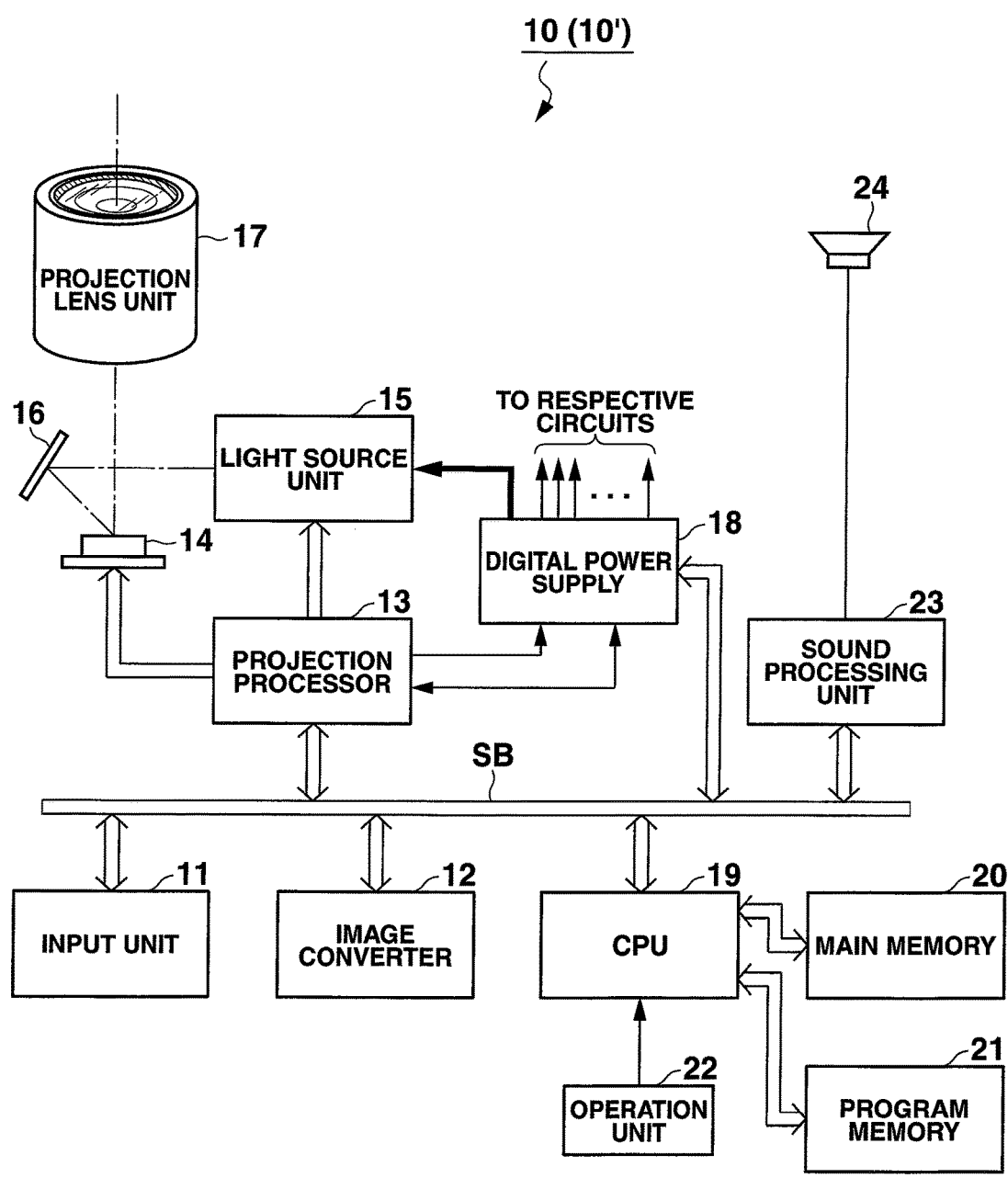
FIG. 1 is a block diagram showing a functional circuit configuration of a projector apparatus according to the first embodiment of the invention.

FIG. 1 shows a schematic functional configuration of a projector apparatus 10 according to the embodiment. An input unit 11 is configured by, for example, a pin-jack-type (RCA) video input terminal, a D-sub15-type RGB input terminal, a high-definition multimedia interface (HDMI) terminal. Analog or digital image signals according to various standards input to the input unit 11 are digitized, if needed, by the input unit 11, and are then fed to the image converter 12 through a system bus SB.

The image converter 12 is commonly referred to also as a scaler or formatter, performs unification of input digital-value image data into a predetermined format suitable for projection, and feeds the image data to a projection processor 13.

At this time, data such as symbols indicating various operation statuses of on-screen display (OSD) is processed to be superposed on the image data, as needed. The image converter further feeds the processed image data to the projection processor 13.

The projection processor 13 drives a micromirror element 14 as a spatial optical modulator to perform display by higher-speed time-divisional driving in which a frame rate of, for example, 120 frames/second, a divisional number of color components, and a number of display gradations, in compliance with the predetermined format, are multiplied according to the fed image data.

The micromirror element 14 operates individually a plurality of micromirrors arrayed on a wide extended graphic array (WXGA: 800 pixels by 1280 pixels) to turn on/off to display an image, and forms an optical image by reflection light thereof.

On the other side, light is emitted in primary colors R, G, and B cyclically in a time-divisional manner from the light source unit 15. The light of primary colors from the light source unit 15 is totally reflected by a mirror 16 and is irradiated onto the micromirror element 14.

An optical image is formed by the reflection light from the micromirror element 14. The formed optical image is projected and displayed through the lens unit 17 onto an unillustrated screen which is a projection target.

The light source unit 15 includes a LED (light emitting diode) which emits red light, a LD (semiconductor laser) which illuminates a fluorescent material to be excited for green light, and a LED which emits blue light.

Under control of a CPU 19 described later, the projection processor 13 performs formation of an optical image by displaying an image through the micromirror element 14, and also performs light emission from the LEDs as light emitting devices in the light source unit 15. In addition, a segment change timing pulse is sent out to the digital power supply 18, and command signals for controlling the power supply are transmitted to and received from the digital power supply 18.

The digital power supply 18 generates and supplies a large number of direct current voltage values which are required for individual circuits, from an AC power supply given to projector apparatus 10. In addition, required power is supplied to the light source unit 15 in order to drive the LEDs and LD.

Figure 2:
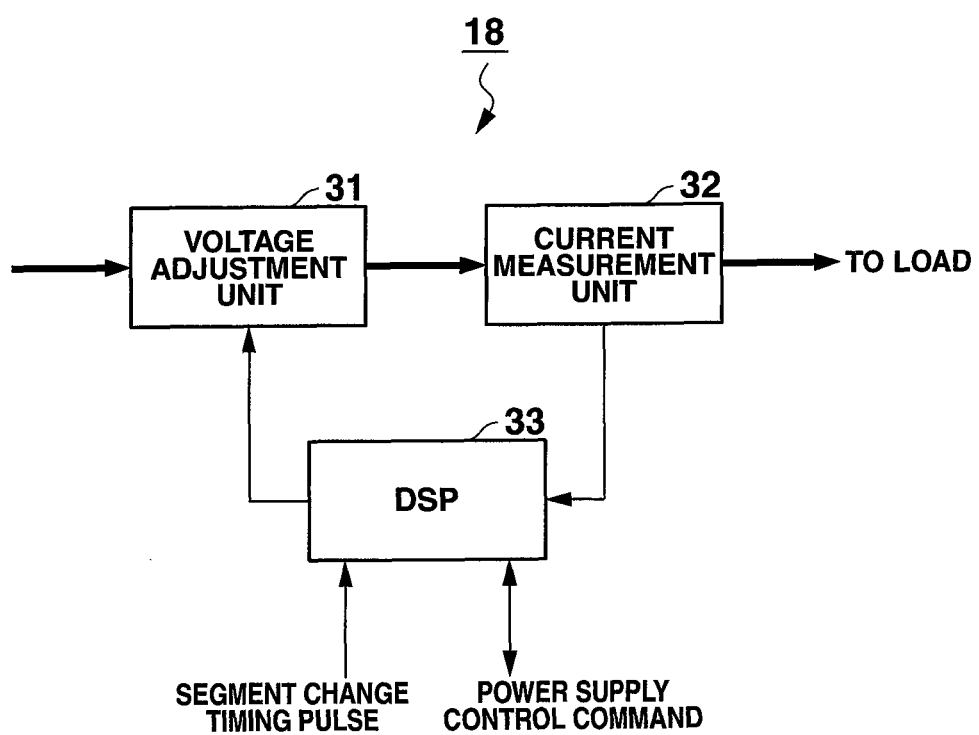
FIG. 2 is a block diagram showing an internal circuit configuration of a digital power supply in FIG. 1, according to the embodiment.

FIG. 2 shows a configuration of a part which drives the light source unit 15 in the digital power supply 18. That is, in the digital power supply 18, a voltage applied to the light source unit 15 is adjusted by a voltage adjustment unit 31. A current measurement unit 32 measures a current value (a light source current value) in the course of supplying loads such as the LEDs and LD in the light source unit 15 with electric power of adjusted voltages. A measurement result from the current measurement unit 32 is fed back to a digital signal processor (DSP) 33. In response to a segment change timing pulse and a power supply control command supplied from the projection processor 13, the DSP 33 performs feedback control on a current value flowing through light emitting devices which are driven at that time, thereby to adjust voltage values at the voltage adjustment unit 31.

The CPU 19 controls whole operations of the circuits described above. The CPU 19 is directly connected to a main memory 20 and a program memory 21. The main memory 20 is configured by, for example, a SRAM and functions as a work memory for the CPU 19. The program memory 21 is configured by an electrically rewritable nonvolatile memory, and stores operation programs and data of various fixed forms to be executed by the CPU 19. The CPU 19 performs control operation in projector apparatus 10 by using the main memory 20 and the program memory 21.

The CPU 19 also performs a variety of projection operations in accordance with key operation signals from an operation unit 22.

The operation unit 22 includes a key operation unit provided on a body of projector apparatus 10, and an infrared-light receiving unit which receives infrared light from an unillustrated remote controller specialized for projector apparatus 30. The operation unit 22 outputs, directly to the CPU 19, key operation signals based on keys which are operated by the key operation unit of the body or by a remote controller of projector apparatus 10.

The CPU 19 is further connected to an audio processor 23 through the system bus SB. The audio processor 23 includes a sound source circuit, such as a PCM tone generator, and converts audio data supplied during a projection operation into an analog signal. The audio processor 33 enhances and outputs the signal through a loudspeaker unit 24. Further, beep sounds are generated if needed.

Next, operation of the present embodiment will be described below.

All operations described below relate to processings which the DSP 33 in the digital power supply 18 executes under control of the CPU 19.

Figure 3:
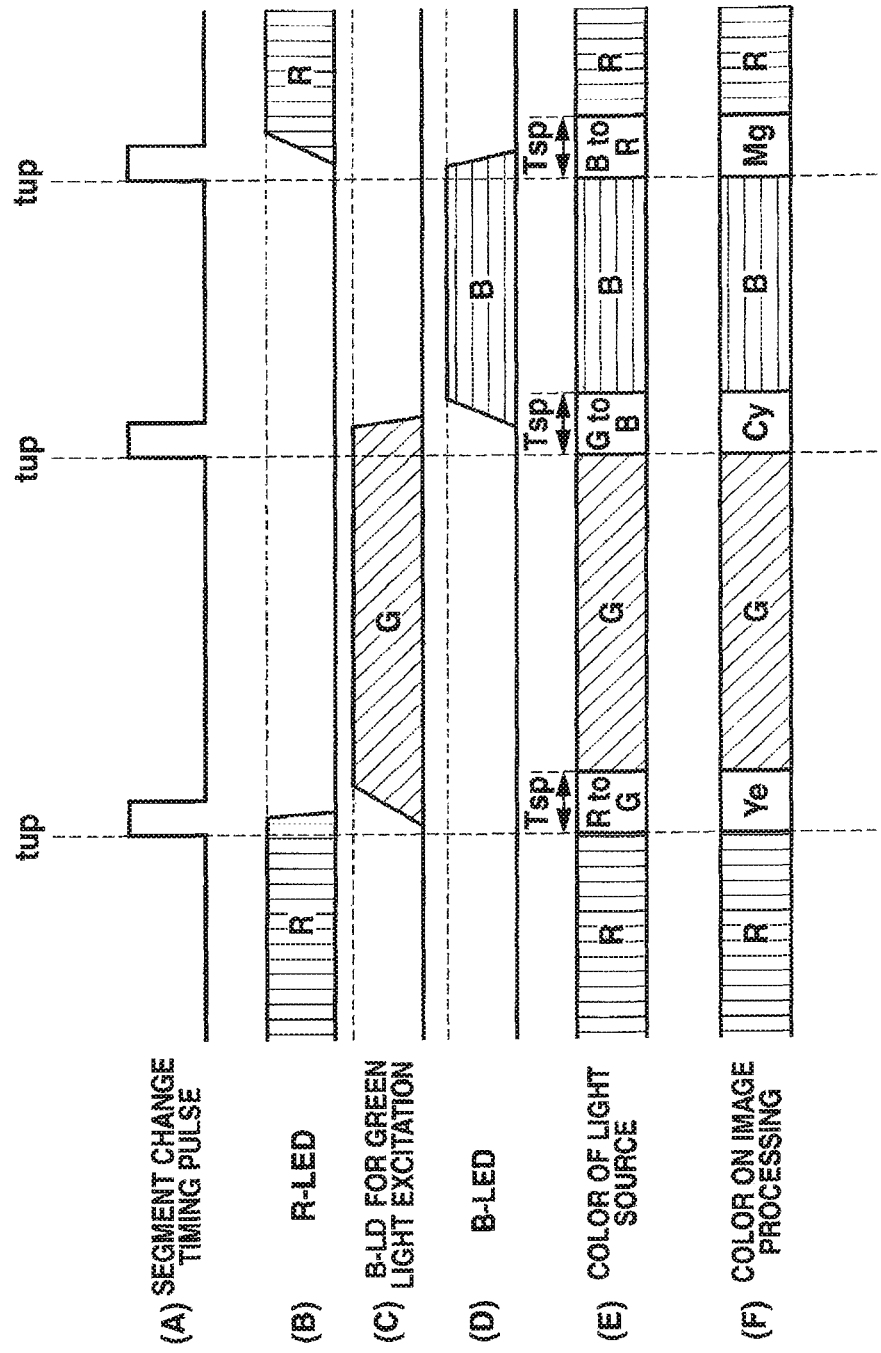
FIG. 3 is a timing chart showing a segment change timing pulse, drive statuses of light emitting devices, and a display screen, according to the embodiment.

FIG. 3 shows the segment change timing pulse input to the digital power supply 18 from the projection processor 13, and an image displayed by the light source unit 15 and the micromirror element 14 which operate in synchronization with the pulse.

As shown in FIG. 3 at (A), as a segment change timing pulse is input to the digital power supply 18 from the projection processor 13, segments of R, G, and B are changed in synchronization with rise timings of the pulse.

Specifically, a constant time Tsp from a rise timing tup of the segment change timing pulse is set as a spoke period. A period from an end timing of the spoke period Tsp to a next rise timing tup is set as a period of each of segments for respectively projecting optical images of the primary colors R, G, and B.

FIG. 3 at (B), (C), and (D) exemplarily shows waveforms of respective drive currents of a LED for red light, a LD which emits blue light to excite a fluorescent material for emitting green light, and a LED which emits blue light.

The digital power supply 18 switches off the light emitting device which has been driven in a previous segment in synchronization with the original timing tup of the spoke period Tsp, and simultaneously starts light emission from the light emitting device used in a next segment.

When to switch off a light emitting device, driving is stopped after a very short standby time. Accordingly, a drive current for each of the light emitting devices falls abruptly.

On the other hand, when to start light emission from a light emitting device, a time lag occurs as a rise period of a current, and thereafter, the current rises at a gentler inclination than an inclination at which the current value falls.

Therefore, light which gradually changes from a color of an immediately preceding segment to a color of a next (present) segment is emitted from the light source unit 15 during a spoke period.

For example, a color of light which the light source unit 15 emits gradually changes to green from red during a spoke period Tsp between a R segment period Tr and a G segment period Tg, as shown in FIG. 3 at (E). During the spoke period Tsp, the projection processor 13 displays an optical image corresponding to yellow (Ye) as a mixed color of red and green by the micromirror element 14, as shown in FIG. 3 at (F).

A color of light which the light source unit 15 emits gradually changes from green to blue during next a spoke period Tsp between the G segment period Tg and a next B segment period Tb. During the spoke period Tsp, the projection processor 13 displays an optical image corresponding to cyan (Cy) as a mixed color of green and blue by the micromirror element 14.

Further, the color of light which the light source unit 15 emits gradually changes from blue to red during a next spoke period Tsp between the B segment period Tb and a next R segment period Tr. During the spoke period Tsp, the projection processor 13 displays an optical image corresponding to magenta (Mg) as a mixed color of blue and red by the micromirror element 14.

On the other hand, respectively in the R, G, and B segments, the projection processor 13 displays optical images corresponding to primary colors by the micromirror element 14 as described above.

Figure 4:
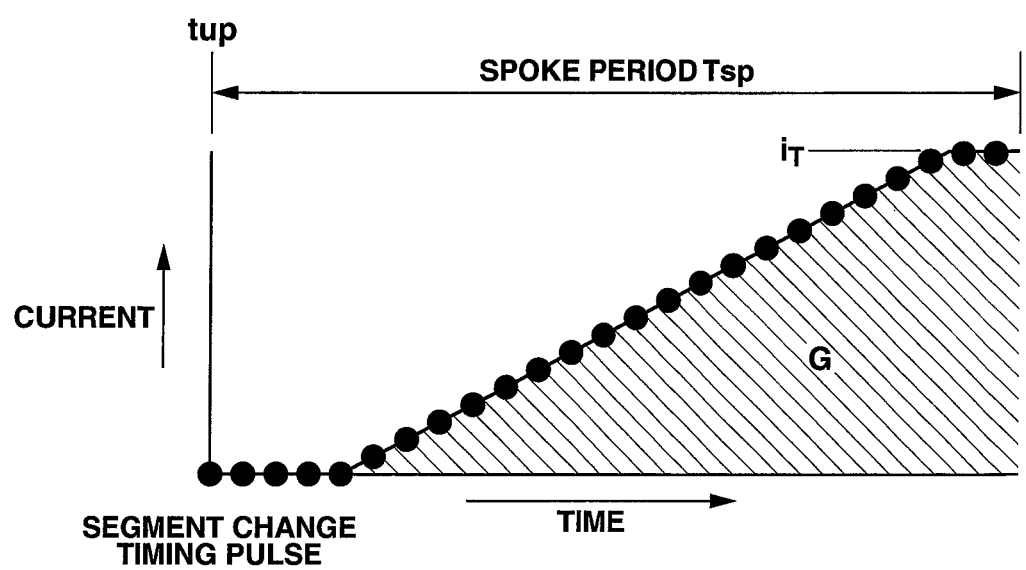
FIG. 4 shows current-value measurement timings in a spoke period according to the embodiment.

FIG. 4 shows an example which graphically expresses control of a drive current of a semiconductor light emitting device in the light source unit 15 by the digital power supply 18 during a spoke period Tsp. In this example, the semiconductor light emitting device in the light source 15 is supposed to be the LD which emits blue light to excite a fluorescent material for green (G) light. The black circular dots shown in the figure indicate sampling timings of current values of the LD which are measured by the digital power supply 18. Thus, as in segment periods, the digital power supply 18 measures fine current values which flow through light emitting devices as control targets during each spoke period. Based on measurement results thereof, control is performed to give feedbacks to voltage values to be applied.

In a spoke period, the digital power supply 18 starts applying a voltage to the LD from the timing tup for start, and measures flowing current values. Specifically, a current value flowing through the LD starts gradually rising after elapse of a current rise time from the timing tup due to a relationship with a forward fall voltage. The digital power supply 18 shifts to a subsequent segment period, i.e., the G segment, while performing feedback control such that a maximum value maintains a target current iT in the figure.

The current rise time during which the current value does not rise since the timing tup varies and cannot be shortened because the current rise time varies depending on individual specificity of the semiconductor light emitting devices and factors of various drive conditions.

Figure 5A:
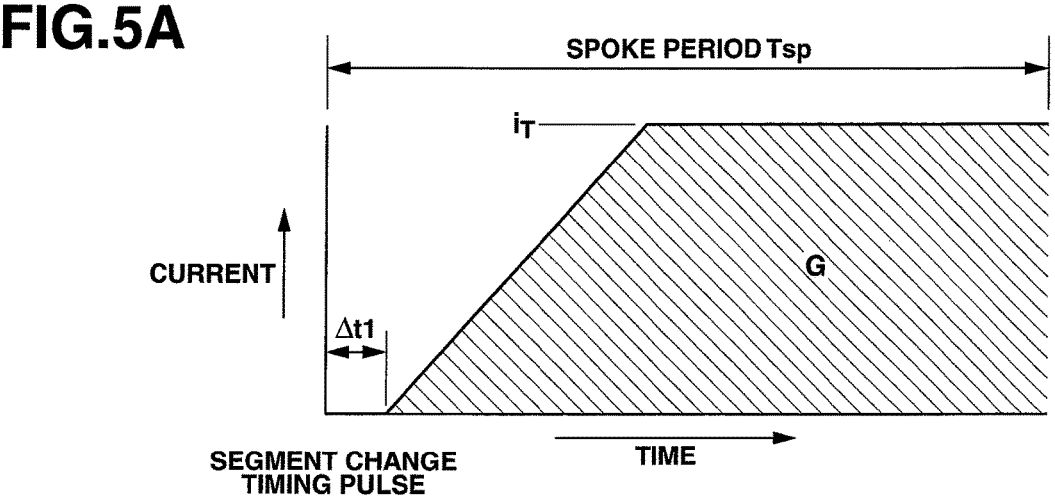
FIGS. 5A and 5B are graphs showing rise properties of spoke periods, which differ depending on individual specificity, according to the embodiment.
Figure 5B:
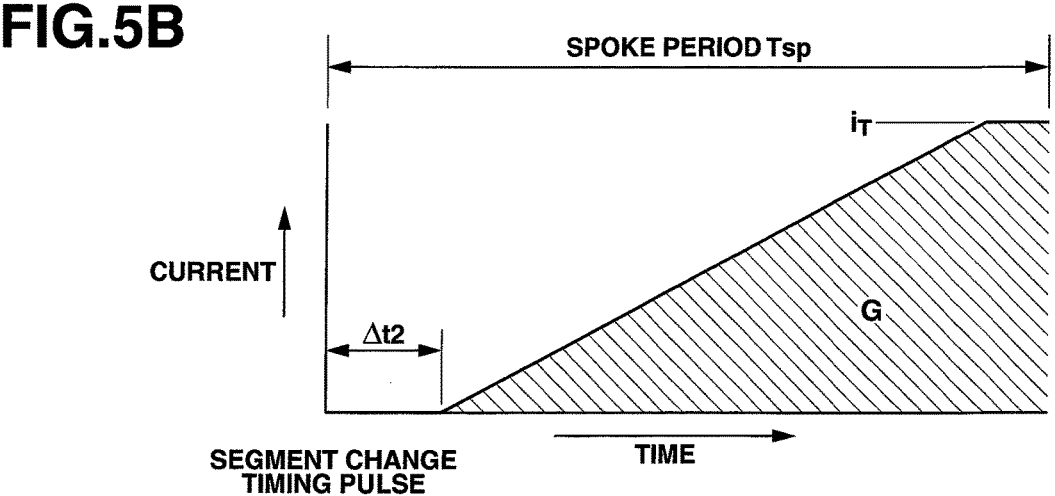

Since FIG. 5A and FIG. 5B show difference among various rise times due to such various factors, as individual properties of two LDs which emit blue light in order to excite green (G) light by a fluorescent material.

A current rise property of the LD in the spoke period shown in FIG. 5A shows a short rise time $\Delta t1$, followed by a steep rise inclination thereafter, which requires a short time until the current value reaches a target current iT. Comparatively, a current rise property of the LD shown in FIG. 5B shows a long rise time $\Delta t2$, followed by a gentle rise inclination thereafter, which requires a long time until the current value reaches a target current iT.

Supposing that the area of a hatched part shown in each figure is proportional to a light emission amount, the light emission amount of the individual LD shown in FIG. 5A is apparently greater among the individuals of the LDs shown in FIG. 5A and FIG. 5B. Therefore, the light emission amount of the individual of a LD which has a more excellent rise property can be adjusted to a light emission amount equivalent to a LD which has a worse rise property, by intentionally delaying a rise time of the former LD. As a result, display gradations of each of color components are corrected in consideration of a fall property and a rise property. Accordingly, images can be projected with maintaining continuity of gradations of concerned color components. Where a measurement value of a ratio of the area of the hatching part to a rectangle formed by a spoke period Tsp and a target current iT is $\alpha$, and a target value of the area of the hatching part to the same rectangle is $\beta$, a delay time Tdl can be expressed as follows.

$$Tdl = Tsp \times (alpha - beta) \quad (1)$$

The target value $\beta$ of the ratio of the area of the hatching part is experimentally set in advance to be an assumable minimum area so that "$(\alpha - \beta)$" may not be a negative value.

As the DSP 33 in the digital power supply 18 calculates the delay time Tdl, the area of the hatching part in the spoke period Tsp can be made constant. As a result, in consideration of the individual specificity of a semiconductor light emitting device, the light emission amount can be maintained constant.

Figure 6A:
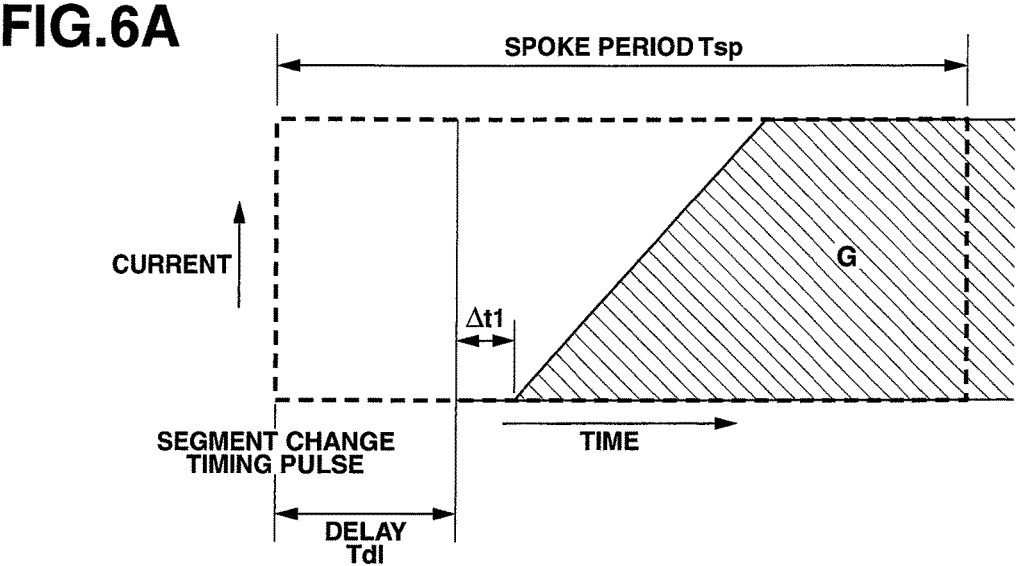
FIGS. 6A and 6B are graphs showing example settings for spoke periods, according to the embodiment.
Figure 6B:
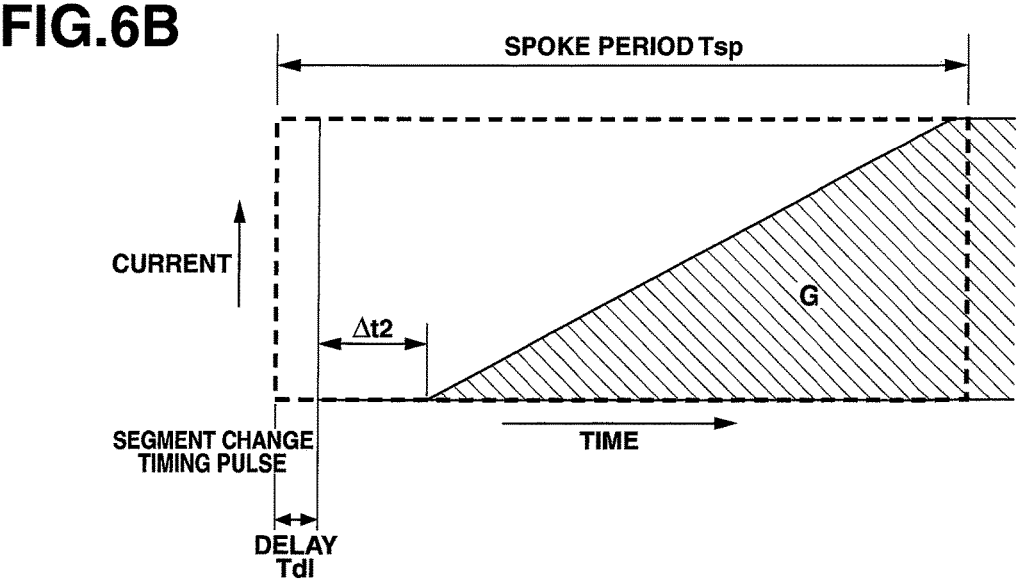

FIGS. 6A and 6B show example settings of such a delay time Tdl. A case shown in the figures is that a delay time Tdl is set for the two LDs which have the rise properties as shown in FIGS. 5A and 5B.

That is, a delay time Tdl calculated by the foregoing expression (1) is set for the LD which had a higher response than the rise property shown in FIG. 5A. In this manner, as shown in FIG. 6A, the area of the hatching part 6A can be made equivalent to the area of the hatching part of the LD which has the rise property shown in FIG. 6B. The light emission amount during the spoke periods Tsp can be set uniformly.

The target value β of the ratio and the time Tsp in the foregoing expression (1) are properly set from assumable maximum and minimum values of the rise time.

This feature is not limited to a rise property with which the light emitting device starts light emission during a spoke period but the same control as described can be performed for a fall property with which light emission from a preceding segment period is stopped during a spoke period and for a case of changing a drive current value for a light emitting device.

Figure 7A:
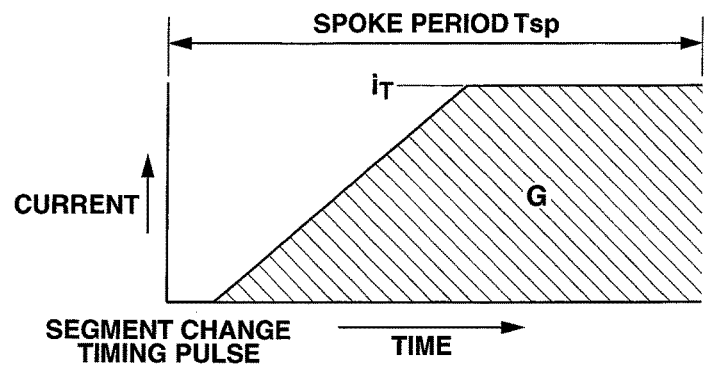
FIGS. 7A, 7B, 7C, and 7D are graphs showing changing scenes in various driving conditions during spoke periods, according to the embodiment.

FIGS. 7A, 7B, 7C, and 7D show changing scenes in various drive conditions during such spoke periods. FIG. 7A shows a rise property of a current value where light emission is started in a spoke period and a target current iT is maintained during a next segment, as has already been described with reference to FIGS. 4, 5A, 5B, 6A, and 6B. Thus, a degree of change for each of the light emitting devices is the greatest when light emission is started to raise a current from a switch-off status. This is because a range through which a current value flowing a load increases most greatly and requires time until a target current value is reached since a start. Since the change is great, influence on gradation expression is also great.

Figure 7B:
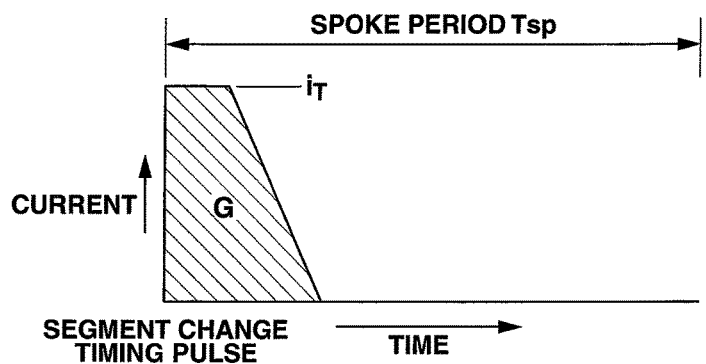

FIG. 7B shows an example of a fall property of a current value when light emission is stopped during a spoke period. Thus, when light emission is stopped, the current value falls from the target current value to a switch-off status in a short time. Therefore, the influence is relatively small in comparison with a rise property from a switch-off status as shown in FIG. 4, 5A, 5B, 6A, 6B, or 7A. Even in this case, gradation expression is influenced by individual specificity of light emitting devices.

Figure 7C:
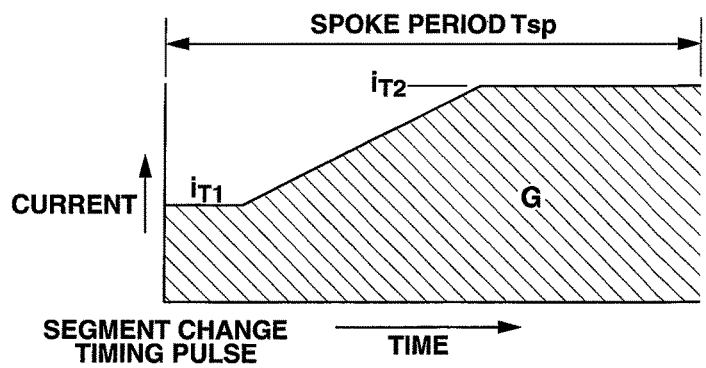

FIG. 7C shows an example of a current value when a current value is increased from a first target current iT1 to a second target current iT2 (iT1<iT2), for example, when one light source is used continuously throughout a plurality of segments. Thus, when a current is increased with maintaining light emission, influence is relatively small in comparison with a rise property from a switch-off status as shown in FIG. 4, 5A, 5B, 6A, 6B, or 7A. However, gradation expression is influenced by individual specificity of light emitting devices.

Figure 7D:
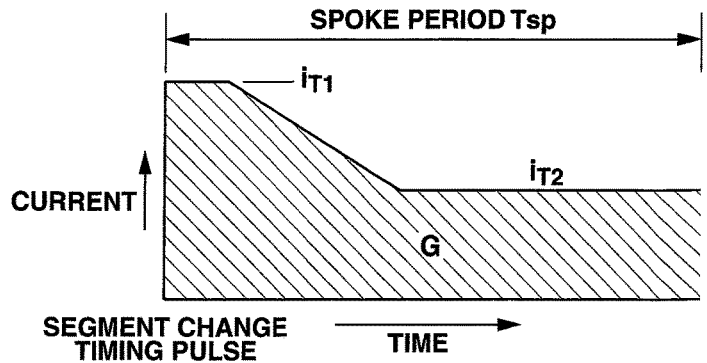

FIG. 7D shows an example of a fall property of a current value when the current value is decreased from a first target current iT1 to a second target current iT2 (iT1>iT2) during a spoke period. Thus, when a current is decreased with maintaining light emission, gradation expression is more easily influenced by individual specificity of the light emitting devices than when a fall property to a switch-off status is as shown in FIG. 7B.

In view of drive statuses during various spoke periods as described above, further generalization of the foregoing expression (1) is considered.

Where the first current target value which is a current target value before change is A, the second current target value as a current target value after change is B, an average measured current value during a spoke period is C, an average target current value during a spoke period is D, and a spoke period is set to a time Tsp, the delay time Tdl can be expressed as follows.

$$Tdl = Tsp \times (C-D)/(B-A) \quad (2)$$

The average target current value D and the time Tsp in the foregoing expression (1) are properly set in advance in accordance with assumable maximum and minimum values of the average measured current value C.

When deviation of continuity of the light emission amount and a current value causes a problem in gradation expression even in the expressions (1) and (2), a light emission amount (illuminance value) is estimated from a current value by a proper conversion expression. Based on the light emission amount, a predetermined correction may be made to the current value, and then the foregoing expression (1) or (2) may be applied.

In addition, in place of estimating a light emission amount from a current value to a light emitting device as described above, for example, an illuminance sensor may further be provided. When a light emission amount (illuminance amount) of each light emitting device can be measured, the light emission amount of each of the light emitting devices can be directly measured in place of measuring the light emission amount.

In this case, where a light emission amount before change is A, a light emission amount after change is B, a measured light-emission-amount value during a spoke period is C, and a target light-emission-amount value during a spoke period is D, the foregoing expression (2) can be applied. The target light-emission-amount value D during a spoke period is obtained by multiplying the light emission amount A before change and the light emission amount B after change, by a constant with use of a calculation expression. In this manner, light emission statuses of light emitting devices are understood more precisely, and fine gradation expression can be achieved. Needless to say, the target light-emission-amount value D during a spoke period may be obtained by actually carrying out experiments.

A next description will be made of a timing at which control described above is performed.

Referring to FIG. 8, a description will be made of an example of drive conditions for a digital power supply 18 with respect to the LED which emits red (R) light in the light source unit 15 and content of control thereof.

When the DSP 33 drives the LED to emit light in a spoke period Tsp immediately before a R segment, an average current value is measured by the current measurement unit 32 (Step S101). Subsequently, the delay time Tdl is calculated using the foregoing expression (1) or (2) (Step S102).

The DSP 33 sets the calculated delay time Tdl (Step S103). During a spoke period Tsp immediately before a R segment in a next image frame, the LED is driven to emit light with a delay time Tdl with a setting newly updated. An average current value is measured again by the current measurement unit 32. A series of processings as described above are repeatedly performed.

Thus, a measurement result in a spoke period is reflected on the same spoke period in a next image frame. Accordingly, changes in the drive statuses of the light emitting devices can be instantaneously dealt with, and gradation expression of projection images can be maintained excellent.

The control as described above is started, for example, upon switch-on of a power, upon elapse of a predetermined operation continuation time (e.g., 10, 30, or 60 minutes), or upon changing of projection modes (e.g., a presentation mode and a theater mode). The control is then suspended one after repetition for a predetermined number of times. Subsequently, standby continues until a timing when the control described above is performed. Alternatively, the control may be, for example, continuously performed until projection of images since start of projection of images.

To simplify descriptions, the above embodiment has been described with reference to, as examples, a LD which emits blue light to excite green (G) light by a fluorescent material and a LED which emits red (R) light. However, the DSP 33 in the digital power supply 18 which actually controls the drive statuses of the light source unit 15 in projector apparatus 10 measures drive statuses of individual light emitting devices which are driven to emit light in total two or three colors if needed during a spoke period. Taken into consideration a balance for each of the colors, the DSP 33 adjusts a light emission amount for each of the colors. Therefore, in each of segment periods of the primary color light R, G, and B, gradation control is performed so as not to spoil color balances throughout a whole image frame, in correspondence with an extent of color mixture (with a complementary color) adjusted during a spoke period. In this manner, proper gradation expression which effectively utilizes control of the spoke period can be achieved.

Thus, in the present embodiment, a delay time is set such that light of each color emitted from the projection lens unit has a desired light emission amount. Therefore, in consideration of changes of the light emission statuses of the light emitting devices used for light sources, image projection can be achieved with maintaining continuity of gradations of colors.

As described above, according to the present embodiment, continuity of gradations of colors are maintained in consideration of changes of light emission statuses of the light emitting devices used for a light source, and accurate projection is constantly achieved with high image quality.

Also in the foregoing embodiment, a start timing of a light emitting device of a color which starts light emission in a spoke period is delayed by control of the light source unit 15 of the digital power supply 18. In this manner, in consideration of a rise property of a light emitting device which tends to be easily influenced on gradation expression, continuity of gradations of colors can be securely maintained.

On the contrary, control may be performed to delay an end timing of a light emitting device which starts light emission during a spoke period. Control may then be performed to maintain the continuity of gradations of colors without decreasing a light emission amount during the spoke period.

In the foregoing embodiment, the light emitting devices in the light source unit 15 are semiconductor light emitting devices, such as LDs and LEDs. By using such semiconductor light emitting devices, precise control can be easily achieved by effectively using the high speed response of the digital power supply 18.

Also in the foregoing embodiment, the digital power supply 18 samples a drive current of each of the light emitting devices in the light source unit 15. From a sampled drive current waveform of each of the light emitting devices, a delay time for a light emission timing in a spoke period is calculated and set. Therefore, effectively using an advantage of the high speed response of as the digital power supply 18, precise control can be easily performed.

Second Embodiment

Hereinafter, the second embodiment will be described with reference to the drawings where the invention is applied to the same DLP projector apparatus as in the foregoing embodiment.

A schematic functional configuration of a projector apparatus according to the present embodiment is basically the same as that shown in FIG. 1 described above. A schematic functional configuration of a part which drives a light source unit 15 inside a digital power supply 18 is basically the same as that shown in FIG. 2. Hereinafter, the same parts are denoted respectively at the same reference symbols as in the foregoing embodiment, and illustrations and descriptions thereof will be omitted.

Next, operation of the present embodiment will be described.

The whole operation described below discloses processings which the DSP 33 in the digital power supply 18 executes under control of the CPU 19.

Under a condition that a voltage value adjusted by a voltage adjustment unit 31 in the digital power supply 18 is constant, gradation expression is greatly influenced when target current values differ greatly. Since a control amount is relatively large when semiconductor light emitting devices, such as LDs and LEDs, are used, a current value to supply needs to be changed greatly in order to change brightness.

If only changes of colors and light emission amounts in a spoke period need to be prevented in accordance with changes of the current value, control greatly simplified in comparison with the method described in the foregoing first embodiment can be achieved.

That is, proper delay times are investigated in advance in correspondence with several drive current values which are assumed for each light emitting device. The proper delay times are stored in form of a lookup table in the DSP 33 or calculation expressions are stored in advance.

Thus, content to be stored in the DSP 33 may be representative values dependent on sizes of individual specificity of each of the light emitting devices or may be stored individually. A proper delay time Tdl is obtained and set from the stored content and measurement results of current values which are actually made flow through light emitting devices. Two methods will now be described below as specific estimation methods for setting the delay time Tdl.

(First Estimation Method: Linear Interpolation)

The first method sets the delay time Tdl by performing interpolation such as linear interpolation, from current values and measurement results of current values measured by the current measurement unit 32.

That is, where a proper delay time at a current A is B, a proper delay time at a current C is D, and a current value to be set for a light source is E, the delay time Tdl is set as follows.

$$Tdl = B + (D-B) \times (E-A)/(C-A) \qquad (3)$$

Thus, the delay time Tdl is calculated by a calculation of the expression (3), and colors and a light emission amount during a spoke period Tsp are thereby maintained constant. Accordingly, gradation expression can be maintained correctly.

(Second Estimation Method: Step Interpolation)

The second method memorizes several ranges of current values and gradual delay times associated with each other in the DSP 33 in form of a lookup table or calculation expressions, and obtains and sets a delay time which is stored in association with a range to which an actual current value belongs.

Thus, setting of the gradual delay times is particularly effective when the drive current values greatly change, for example, by changing of operation modes, which is accompanied by increase or decrease of light emission amounts of the individual light emitting devices.

In any case of adopting either one of the two methods described above, continuity of gradations of colors are maintained in consideration of changes of light emission statuses of the light emitting devices used for a light source, and precise projection is constantly achieved with high image quality. Further compared with the first embodiment, a control load on the DSP 33 in the digital power supply 18 is reduced greatly, and the configuration of the digital power supply 18 can be accordingly simplified.

In the first and second embodiments described above, the light source unit 15 of projector apparatus 10 makes LEDs directly emit red (R) light and blue (B) light, and excites a fluorescent material with blue light which a LD emits, thereby to obtain green (G) light. However, the invention limits neither types nor the number of light emitting devices used as light sources.

In addition to the embodiments described above, for example, light emission amounts of light of respective colors R, G, and B during all the spoke periods included in one color image frame are measured. Thereafter, a constant which expresses a total light emission amount during three spoke periods Tsp is calculated by calculation. Based on the constant, delay times of light emission timings in the respective spoke periods may be set all at once. This setting is to make a total of light emission amounts in a plurality of spoke periods in one color image frame be equal to a desired light emission amount.

In this manner, display gradations of a corresponding color component are corrected in consideration of fall and rise properties in each spoke period. Control is performed so as to obtain proper total color balances in three spoke periods Tsp throughout one color image frame. Further, delay setting of light emission timings is performed for each one color image frame. Therefore, the load applied to the CPU 19 can be more reduced than in the foregoing embodiments.

Also in the foregoing embodiments, a delay time for a light emission timing in a spoke period is calculated from a sampled drive current waveform of each light emitting device. The invention is not limited hitherto but a delay time for a light emission timing in a spoke period may be calculated from a drive power waveform or a drive voltage waveform for each light emitting device.

Third Embodiment

The third embodiment will now be described with reference to the drawings where the invention is applied to a DLP projector apparatus.

A schematic functional configuration of a projector apparatus 10' according to the present embodiment is basically the same as that shown in FIG. 1 described above. A schematic functional configuration of a part which drives a light source unit 15 inside a digital power supply 18 is basically the same as that shown in FIG. 2. Hereinafter, the same parts are denoted respectively at the same reference symbols as in the foregoing embodiments, and illustrations and descriptions thereof will be omitted.

In addition to functions described previously, a projection processor 13 of projector apparatus 10' prestores a plurality of spoke calibration sets, each of which includes display gradations for light emitting devices in a spoke period as will be described later. Based on a selected calibration set, display gradations by the micromirror element 14 are controlled during the spoke period, in synchronization with light emission timings of the light emitting devices.

Next, operation of the present embodiment will be described.

FIG. 9 is a flowchart showing content of processings concerning color balance settings of a projection image, which are performed mainly by the CPU 19.

In the beginning, the CPU 19 waits for predetermined timings to perform color balance settings (Step S201).

The predetermined timings of setting color balances include timings which are manually instructed about by a user, in addition to timings which are automatically determined by projector apparatus 10, such as, switch-on of the power supply, elapse of predetermined continuous operation times (e.g., 10, 30, and 60 minutes), changing of projection modes (e.g., a presentation mode and a theater mode).

When the CPU 19 determines that a timing comes to perform a color balance setting in Step S201 described above, a drive current value is measured for each of a LED which emits red light and a LD which emits blue light to excite green light in a first spoke period Tsp (i.e., a spoke period between a R segment period Tr and a G segment period Tg) (Step S202).

After performing measurement in the first spoke period Tsp in Step S202 above, the CPU 19 measures a drive current value for each of the LD which emits blue light to excite green light and a LED which emits blue light in a subsequent second spoke period Tsp (i.e., a spoke period between a G segment period Tg and a B segment period Tb) (Step S203).

Further, the CPU 19 measures a drive current value for each of the LED which emits blue light and the LED which emits red light in a subsequent third spoke period Tsp (i.e., a spoke period between a B segment period Tb and a R segment period Tr) (Step S204).

In this manner, upon completion of measuring the drive current values of the light emitting devices in the three spoke periods existing in one color image frame, the CPU 19 calculates a constant which expresses, for example, a total light emission amount throughout the first to third spoke periods by calculating emission amounts of light of R, G, and B from results measured in the individual spoke periods Tsp (Step S205).

Based on a calculation result thereof, the CPU 19 selects a spoke calibration set whose numerical value is most approximate among the plurality of spoke calibration sets stored in advance in the projection processor 13 (Step S206), and sets newly the selected spoke calibration set in the projection processor 13 (Step S207). That is, as shown in FIGS. 6A and 6B, actual light emission amounts during the spoke periods differ from light emission amounts measured in advance, due to rise and fall properties of individuals of the semiconductor light emitting devices. However, in the present embodiment, images can be projected with maintaining continuity of gradations of individual color components in consideration of the rise and fall properties by newly setting another spoke calibration set corresponding to a light emission amount at the current time.

This setting is to make a total of light emission amounts in a plurality of spoke periods in one color image frame become a desired light emission amount. In this manner, display gradations are corrected in consideration of the rise and fall properties of corresponding color components in each of the spoke periods. As a result, control is performed to obtain totally proper color balances in the three spoke periods Tsp throughout one color image frame. The CPU 19 then returns to processings from Step S201 described above to be ready for performing the same control as described.

Next, referring to FIG. 10, content of control to be performed particularly on the LED which emits red (R) light in the light source unit 15 will be described with reference to a case of performing continuously the control as described above.

As shown in the same figure, when the DSP 33 drives the LED to emit light in a spoke period Tsp immediately before a R segment period Tr, a drive current value is measured by the current measurement unit 32 (Step S204). Subsequently, the same measurement as described is performed during the other two segment periods not shown in the figure (Step S205). The CPU 19 selects one from the plurality of calibration sets prepared by the projection processor 13, and newly sets the selected calibration set in the projection processor 13 (Steps S206 and S207). Further in a spoke period Tsp immediately before a R segment period Tr in a next image frame, display gradations of the micromirror element 14 are controlled when the LED which emits red (R) light emits light, to maintain a color balance properly by gradation control of the R component in a complementary-color image during a spoke period, which is projected from the projection lens unit 17.

In this spoke period Tsp, the same processing as described above is repeatedly performed by measuring the drive current value of the LED which emits red (R) light as described above by the current measurement unit 32. This color balance setting may be periodically performed for a predetermined number of times sequentially. Alternatively, the control may be continuously performed since start of projection of images until completion of projection of images.

Figure 10:
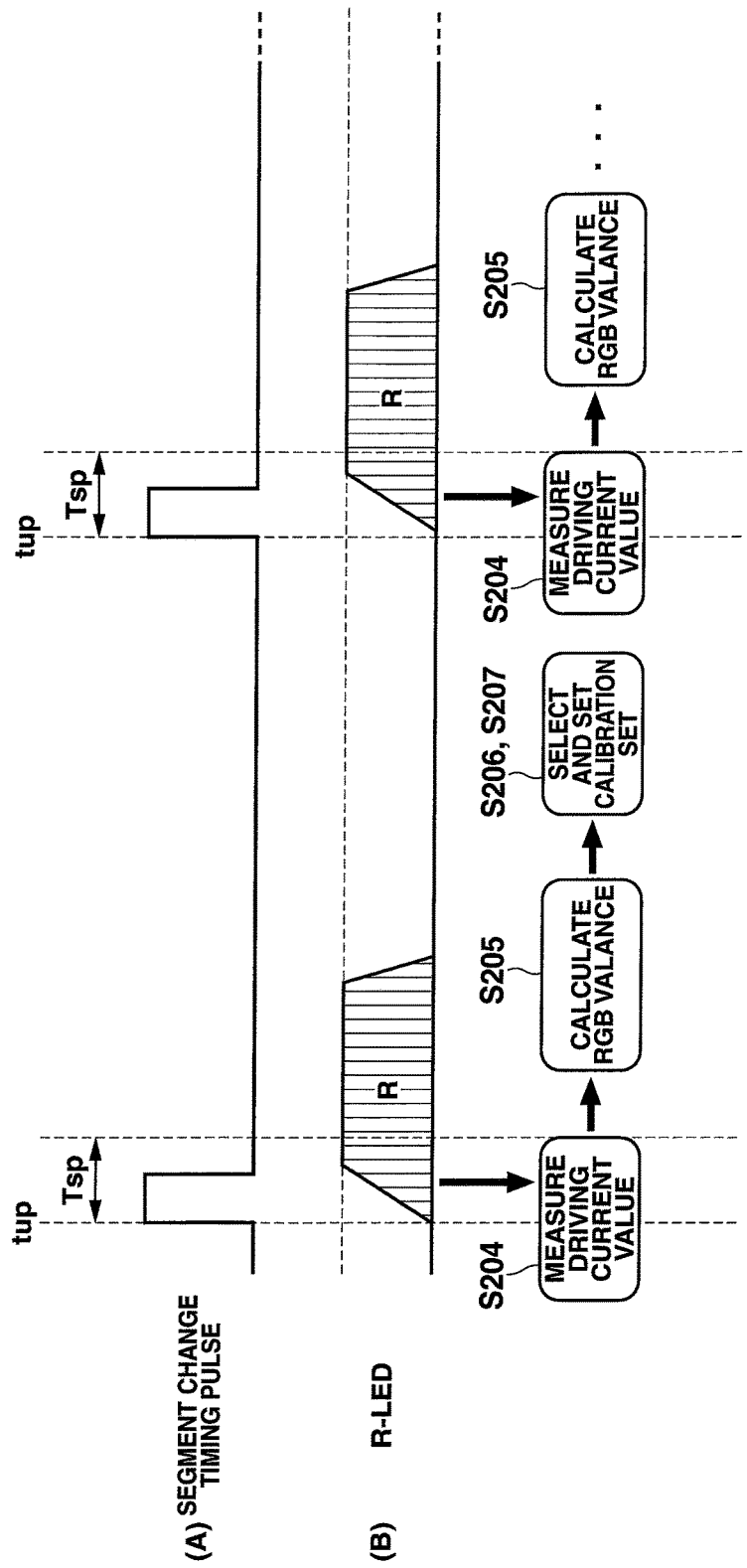
FIG. 10 is a chart for explaining content of control of a LED which emits red (R) light, according to the embodiment.

FIG. 10 as described above extracts and shows content of control which is performed particularly on the LED which emits red (R) light in the light source unit 15. Needless to say, the same processing as described is performed in parallel on the other light emitting devices, i.e., LD which emits blue light to excite green (G) light and the LED which emits blue (B).

Thus, measurement results in spoke periods can be reflected on spoke periods in a next image frame. Accordingly, changes in the drive statuses of the light emitting devices can be instantaneously dealt with. As a result, gradation expression of projection images can be maintained excellent.

Thus, in the present embodiment, light of R, G, and B color emitted from the projection lens is projected after being modulated to a desired light emission amount which has been set in advance. Therefore, image projection can be achieved with maintaining continuity of gradations of colors in consideration of changes of the light emission statuses of the light emitting devices used as light sources.

As described above, according to the present embodiment, continuity of gradations of colors are maintained in consideration of changes of light emission statuses of the light emitting devices used as light sources, and precise projection is constantly achieved with high image quality.

Further in the present embodiment described above, a plurality of calibration sets for correcting gradations in spoke periods are prestored in the projection processor 13, and the most approximate calibration set is selected and set in correspondence with a color balance at a time point. As a result, content of control performed by the CPU 19 and projection processor 13 is simplified, and the load on each of the CPU 19 and the projection processor 13 can be reduced.

In addition, in the embodiment described above, control is performed in compliance with a rise property at the time of starting light emission when variants of properties is conspicuous depending on individual specificity, by controlling display gradations of the micromirror element 14 in synchronization with start of light emission of a light emitting device which starts light emission in a spoke period. In this manner, continuity of gradations of colors can be securely maintained in consideration of a rise property of a light emitting device whose gradation expression is easily influenced.

In the above embodiment, display gradations of the micromirror element 14 are controlled in compliance with a property of a light emitting device which stops light emission during a spoke period. In this manner, color blurring due to individual specificity of light emitting devices is suppressed, and continuity of gradations of colors is maintained. Precise projection can be constantly performed with high image quality.

Also in the above embodiment, the light emitting devices in the light source unit 15 are configured by semiconductor light emitting devices, such as LDs and LEDs. By using such semiconductor light emitting devices, precise control can be easily achieved by effectively using the high speed response of the digital power supply 18.

Still also in the above embodiment, the digital power supply 18 measures a drive current value for a light emitting device, as an equivalence to the light amount of each of the light emitting devices. Therefore, a configuration of a luminance sensor for directly detecting a light amount can be omitted, and a configuration of the apparatus can be simplified more.

The above embodiment has been described with reference to a case of controlling gradation expression by the micromirror element 14 in a spoke period in order to adjust color balances based on drive current values of light emitting devices in the spoke period. However, as a result of setting newly a spoke calibration set in the projection processor 13, gradations of white light expressed by using both complementary-color light in a spoke period and a primary color in a R, G, or B segment period may shift off from original settings. In such a situation, color balances may be adjusted so that a color of while light and gradations correspond to original settings, by additionally changing a ratio among lengths of the R, G, and B segment periods as pure color periods.

By thus additionally setting a variable ratio among the lengths of the pure color periods, ranges of color balance adjustment can be wider with higher precision, and image projection can be constantly performed with proper color balances.

Further, not only display gradations of the micromirror element 14 in the spoke periods are controlled as described in the above embodiment but also drive powers for the respective light emitting devices, e.g., currents may be set to be variable during the spoke periods.

Thus, differences in rise and fall properties due to individual specificity among the light emitting devices are absorbed by setting drive powers to be variable during the spoke periods. Accordingly, image projection can be achieved with proper color balances.

The invention is not limited to the above embodiment but spoke calibration may be set for each of the light emitting devices in each of the spoke periods, at timings in each of the first to third spoke periods throughout one color image frame.

That is, the CPU 19 calculates a light emission amount by measuring a drive current value of each of the LED which emits red light and the LD which emits blue light to excite green light during a spoke period Tsp between a R segment period Tr and a G segment period Tg. Based on a calculation result thereof, a spoke calibration set which has the most approximate numerical value is selected and set among the plurality of spoke calibration sets for Tr–Tg, which are prestored in the projection processor 13.

Next, the CPU 19 calculates a light emission amount by measuring a drive current value of each of the LD which emits blue light for green light excitation and the LED which emits blue light during a subsequent spoke period Tsp between the G segment period Tg and a subsequent B segment period Tb as well. Based on a calculation result thereof, a spoke calibration set which has the most approximate numerical value is thereafter selected and set among the plurality of spoke calibration sets for Tg–Tb, which are prestored in the projection processor 13.

Further, the CPU 19 calculates a light emission amount by measuring a drive current value of each of the LED which emits blue light and the LED which emits red light during a subsequent spoke period Tsp between the B segment period Tb and a R segment period Tr. Based on a calculation result thereof, a spoke calibration set which has the most approximate numerical value is thereafter selected and set among the plurality of spoke calibration sets for Tb–Tr, which are prestored in the projection processor 13.

Thus, in the projection processor 13, a spoke calibration set is prestored for each of the three spoke periods which exist in one color image frame. A spoke calibration set may be newly set at each of timings respectively in the three spoke calibration sets throughout one color image frame.

Even in this case, continuity of gradations of colors is maintained in consideration of changes of light emission statuses of the light emitting devices used as light sources, and precise projection can be constantly performed with high image quality.

Also in the above embodiments, spoke calibration during a spoke period is calculated from a sampled drive current waveform of each of the light emitting devices. The invention is not limited to this calculation but spoke calibration during a spoke period may be determined from a drive power waveform or a drive voltage waveform of each of the light emitting devices.

In the above embodiments, the light source unit 15 of projector apparatus 10 makes LEDs directly emit red (R) light and blue (B) light, and obtains green (G) light by exciting a fluorescent material with blue light which a LD emits. However, the invention limits neither types nor the number of light emitting devices used as light sources.

Further, the invention is not limited to the embodiments described above but can be variously modified in practical phases without deviating from the subject matters of the invention. In addition, functions performed by the embodiment described above may be combined as appropriately as possible, and may be performed. The embodiment described above further includes various stages, and various inventions can be derived by appropriate combination of a plurality of disclosed components. For example, even if several components are removed from all the components disclosed in the embodiment, the configuration from which the several components are removed may be extracted as an invention, insofar as effects of the invention are achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a light source unit configured to time-divisionally emit light in a plurality of colors by light emission from a plurality of light emitting devices;
   a display element configured to form optical images respectively corresponding to the plurality of colors of the light emitted from the light source unit;
   a projection unit configured to emit the optical images formed by the display element toward a projection target;
   a spoke setting unit configured to set a change timing associated with changing each of the plurality of colors, and to set spoke periods generated at each change timing;
   a light source drive unit configured to drive the light source unit, based on the change timings and the spoke periods set by the spoke setting unit;
   a detection unit configured to obtain information indicating a light amount of the light for each of the plurality of colors, which are emitted from the projection unit during the spoke periods; and
   a light source controller configured to set, based on the information indicating the light amount of the light for each of the plurality of colors that is obtained by the detection unit in a previous spoke period, a delay time for a light emission timing at the light source unit in a same spoke period subsequent to the previous spoke period by one color image frame, and to control the light source unit so as to adjust a color balance of color mixtures in the spoke periods to a predetermined balance according to the delay time for the light emission timing at the light source unit in the subsequent spoke period.

2. The projection apparatus according to claim 1, wherein the light source controller is configured to control display gradations of the optical images formed by the display element during the spoke periods, based on the information indicating the light amount, which is obtained by the detection unit.

3. The projection apparatus according to claim 1, wherein the light source controller is configured to set delay times for light emission timings at the light source unit in the spoke periods such that the light for each of the plurality of colors, which is emitted from the projection unit during the spoke periods, has a desired light emission amount.

4. The projection apparatus according to claim 1, wherein:
   the spoke setting unit is configured to set a plurality of spoke periods in a single color image frame, and
   the light source controller is configured to set delay times for light emission timings at the light source unit in the spoke periods such that a total light amount of the light for the plurality of colors during the spoke periods included in the single color image frame has a desired light emission amount.

5. The projection apparatus according to claim 1, wherein:
the detection unit is configured to sample at least one of a drive current waveform, a drive voltage waveform, and a drive power waveform of each of the light emitting devices of the light source drive unit, and
the light source controller is configured to calculate and set delay times for light emission timings at the light source unit during the spoke periods, from a sampling result obtained by the detection unit.

6. The projection apparatus according to claim 1, further comprising a storage unit configured to store a drive power for the light emitting devices, associated with delay times for light emission timings at the light source unit in the spoke periods,
wherein the light source controller is configured to read and set the delay times for the light emission timings from the storage unit, based on a detection result obtained by the detection unit.

7. The projection apparatus according to claim 1, wherein:
the detection unit is configured to measure an illuminance value of the light for each of the plurality of colors which are emitted from the light source unit, and
the light source controller is configured to calculate and set delay times for light emission timings at the light source unit in the spoke periods, from the illuminance values obtained by the detection unit.

8. The projection apparatus according to claim 1, wherein the light source controller is configured to set delay times for each light emission start time at the light source unit in the spoke periods by the light source drive unit.

9. The projection apparatus according to claim 1, wherein the light source controller is configured to set delay times for each light emission end time at the light source unit in the spoke periods by the light source drive unit.

10. The projection apparatus according to claim 1, wherein each of the light emitting devices of the light source unit uses at least one of a semiconductor laser and a light emitting diode.

11. The projection apparatus according to claim 1, wherein the light source controller is configured to set delay times for light emission timings at the light source unit at corresponding spoke periods in a plurality of frames where a same color mixture is generated, based on a detection result of the light amount detected at a previous spoke period.

12. A projection method applied to an apparatus including a light source unit configured to time-divisionally emit light in a plurality of colors by light emission from a plurality of light emitting devices, a display element configured to form optical images respectively corresponding to the plurality of colors of the light emitted from the light source unit, and a projection unit configured to emit the optical images formed by the display element toward a projection target, the method comprising:

setting a change timing associated with changing each of the plurality of colors, and setting spoke periods generated at each change timing;
driving the light source unit, based on the change timings and the spoke periods set in the setting;
obtaining information indicating a light amount of the light for each of the plurality of colors, which are emitted from the projection unit during the spoke periods; and
setting, based on the information indicating the light amount of the light for each of the plurality of colors that is obtained in a previous spoke period, a delay time for a light emission timing at the light source unit in a same spoke period subsequent to the previous spoke period by one color image frame, and controlling the light source unit so as to adjust a color balance of color mixtures in the spoke periods to a predetermined balance according to the delay time for the light emission timing at the light source unit in the subsequent spoke period.

13. A non-transitory computer-readable storage medium having a program stored thereon that is executable by a computer in an apparatus including a light source unit configured to time-divisionally emit light in a plurality of colors by light emission from a plurality of light emitting devices, a display element configured to form optical images respectively corresponding to the plurality of colors of the light emitted from the light source unit, and a projection unit configured to emit the optical images formed by the display element toward a built-in target, the program being executable by the computer to cause the computer to perform functions comprising:
setting a change timing associated with changing each of the plurality of colors, and setting spoke periods generated at each change timing;
driving the light source unit, based on the change timings and the spoke periods set in the setting;
obtaining information indicating a light amount of the light for each of the plurality of colors, which are emitted from the projection unit during the spoke periods; and
setting, based on the information indicating the light amount of the light for each of the plurality of colors that is obtained in a previous spoke period, a delay time for a light emission timing at the light source unit in a same spoke period subsequent to the previous spoke period by one color image frame, and controlling the light source unit so as to adjust a color balance of color mixtures in the spoke periods to a predetermined balance according to the delay time for the light emission timing at the light source unit in the subsequent spoke period.

* * * * *

UNITED STATES PATENT AND TRADEMARK OFFICE
CERTIFICATE OF CORRECTION

PATENT NO. : 9,927,686 B2
APPLICATION NO. : 14/014099
DATED : March 27, 2018
INVENTOR(S) : Tetsuro Narikawa Page 1 of 1

It is certified that error appears in the above-identified patent and that said Letters Patent is hereby corrected as shown below:

On the Title Page

Column 1, Item (30), under "Foreign Application Priority Data", after "August 31, 2012 (JP) 2012-192575" insert --August 31, 2012 (JP) 2012-192577--.

Signed and Sealed this
Fifth Day of February, 2019

Andrei Iancu
*Director of the United States Patent and Trademark Office*